(12) United States Patent
Takaki

(10) Patent No.: US 6,532,502 B1
(45) Date of Patent: Mar. 11, 2003

(54) COMMAND QUEUE CONTROL DEVICE

(75) Inventor: Toshiaki Takaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/465,453

(22) Filed: Dec. 17, 1999

(30) Foreign Application Priority Data

Dec. 17, 1998 (JP) .......................................... 10-359110

(51) Int. Cl.[7] .............................................. G06F 13/00
(52) U.S. Cl. .............................. 710/52; 710/1; 710/33; 710/34; 710/52; 710/54; 710/55; 710/56
(58) Field of Search ............................... 710/1, 33, 52, 710/34, 54, 55, 56

(56) References Cited

U.S. PATENT DOCUMENTS

| | | | | |
|---|---|---|---|---|
| 5,603,063 A | * | 2/1997 | Au ................................ | 710/52 |
| 5,828,902 A | * | 10/1998 | Tanaka et al. ................. | 710/39 |
| 5,890,208 A | * | 3/1999 | Kwon ........................... | 711/112 |
| 6,188,690 B1 | * | 2/2001 | Holden et al. ................ | 370/390 |
| 6,282,578 B1 | * | 8/2001 | Aizono et al. ................ | 709/310 |

FOREIGN PATENT DOCUMENTS

| | | |
|---|---|---|
| JP | 6-161934 | 6/1994 |
| JP | 9-258907 | 10/1997 |
| JP | 10-289189 | 10/1998 |

* cited by examiner

Primary Examiner—Jeffrey Gaffin
Assistant Examiner—Mohammad O. Farooq
(74) Attorney, Agent, or Firm—Foley & Lardner

(57) ABSTRACT

A command queue control device, when there is the command which is not completed in spite of a lapse of prescribed time period, is capable of facilitating the command processing of the disk device, even though delay occurs in the command processing of the disk device, by causing the disk device to facilitate acceleration of the command. The command queue control device comprises a measure for storing therein a command from a host computer, a measure for allocating a tag to the stored command, a measure for adding a current time to a command queue to which the tag is allocated, a measure for storing therein the command queue to which the tag and the current time are added, a measure for publishing a command to a disk device while fetching the command queue stored in the above-described storing measure, a measure for supervising lapse time of the command queue stored in the storing measure, and a measure for implementing control so as to facilitate acceleration of the command processing of the disk device when the command which is not executed yet although the prescribed time period elapses is detected.

8 Claims, 2 Drawing Sheets

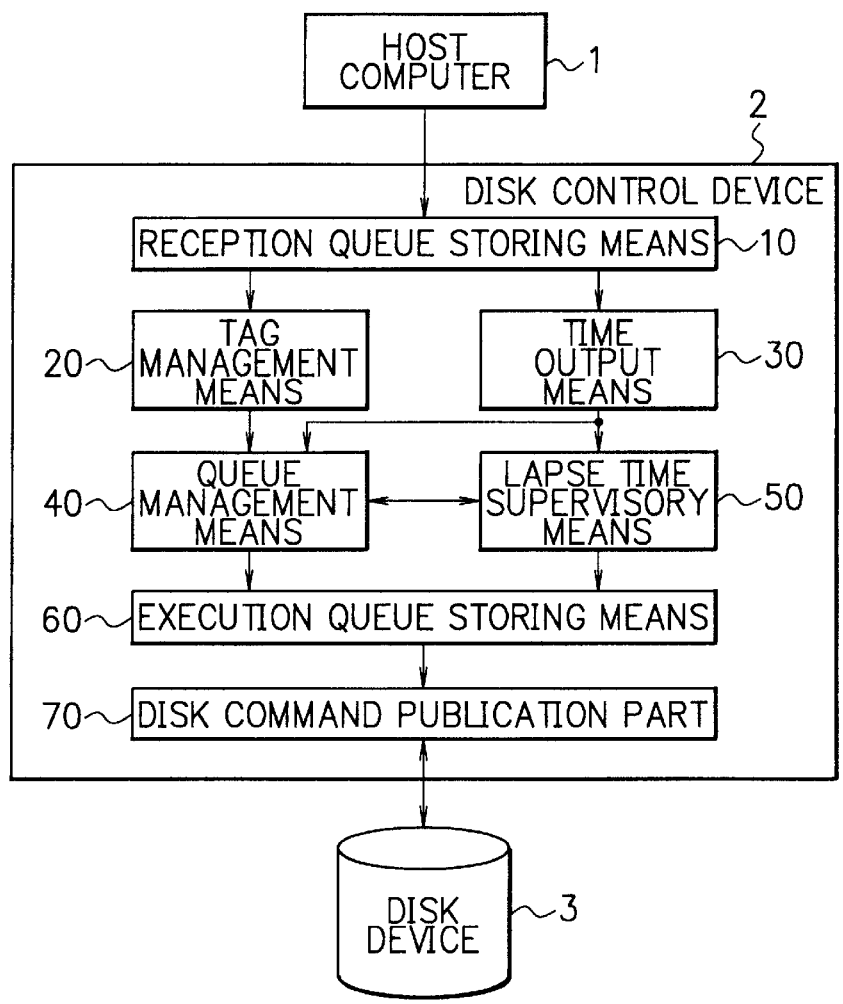
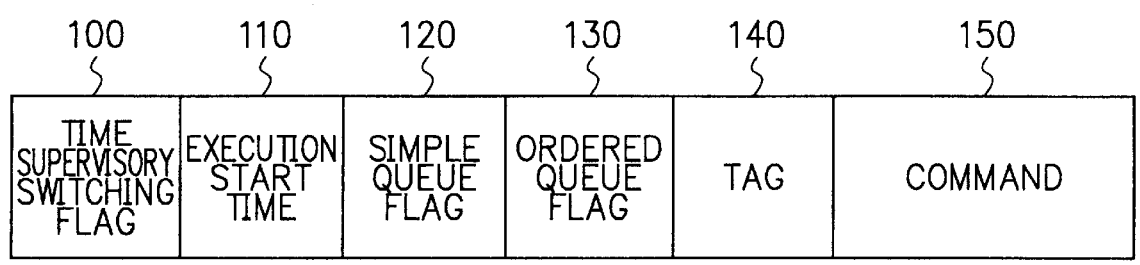

COMMAND QUEUE CONTROL DEVICE

BACKGROUND OF THE INVENTION

The present invention relates to a disk control device for connecting a host computer with a disk device. More particularly, this invention relates to a command queue control device for controlling access for the disk device.

DESCRIPTION OF THE PRIOR ART

Formerly, in SCSI (Small Computer System Interface), Simple Queue Tag message, Ordered Queue Tag message, and Head of Queue Tag message are standardized. The Simple Queue Tag message is a message used in a disk device determining execution order in order to control the command queue. The Ordered Queue Tag message is a message for executing processing of the queue which is already subjected to queuing reservation. The Head of Queue Tag message is a message causing processing of queue to be executed under the highest priority. On the other hand, in open systems such as Windows, NT, UNIX, and so forth, only the Simple Queue Tag message is employed.

Now, there is a method for securing specific response in the disk device. For instance, the method for securing specific response in the disk device disclosed in the official report of Japanese Patent Application Laid-Open No. HEI 9-258907 is well known. In this official report, an external storage control device is provided with a predictive processing time generation means for predicting command processing time, a sending queue for storing queue so as to enter a sum of the predicted time within a period of a prescribed time interval, and a command batch generation means storing the command queue with already queuing reservation in a receiving queue into the sending queue when the sending queue becomes empty, the method for securing specific response is adopted such that command published to the disk device is limited.

In such the conventional technique, in the case of an open system such as a system employing the SCSI standard; Windows, NT, UNIX, and so forth, the disk device determines the execution order of the command according to a Simple Queue Tag message. Consequently, in order to secure specific response of the disk device, the open system always should limit publication of the command so as not to occur I/O-delay of the disk device.

SUMMARY OF THE INVENTION

In view of the foregoing, it is an object of the present invention, in order to overcome the above-described problem, to provide a command queue control device capable of securing specific response of the disk device simply.

According to a first aspect of the present invention, in order to achieve the above-described object, there is provided a command queue control device which comprises a reception queue storing means for storing therein a command received from a host computer, a means for allocating a tag of a queue management number to the command stored in the reception queue storing means, a means for adding a current time to a command queue to which the tag is allocated, an execution queue storing means for storing therein the command queue to which the tag and the current time are added, a means for publishing the command to a disk device while fetching the command queue stored in the execution queue storing means, a means for supervising a lapse time of the command queue stored in the execution queue storing means, and a means for implementing control so as to facilitate acceleration of command processing of the disk device when a command is detected by the supervisory means, which command is not executed in spite of a lapse of prescribed time period.

According to a second aspect, in the first aspect, there is provided a command queue control device, wherein the control means halts publication of a command to the disk device when a command is detected by the lapse time supervisory means, which command is not executed in spite of lapse of a second prescribed time period additionally after elapsing the previous prescribed time period.

According to a third aspect of the present invention, in the second aspect, there is provided a command queue control device, wherein the control means resumes publication of a command after completion of the whole processing of the command queues stored in the execution queue storing means.

According to a fourth aspect of the present invention, in the first aspect, there is provided a command queue control device, wherein the supervisory means calculates lapse time period of the command queue from difference between a time added to the command queue and a current time.

According to a fifth aspect of the present invention, there is provided a command queue control method comprising the stops of a step for storing a command received from a host computer in a reception queue storing means, a step for allocating a tag of a queue management number to the command stored in the reception queue storing means, a step for adding a current time to a command queue to which the tag is allocated, a step for storing the command queue to which the tag and the current time are added in an execution queue storing means, a step for publishing the command to a disk device while fetching the command queue stored in the execution queue storing means, a step for supervising a lapse time of the command queue stored in the execution queue storing means, and a step for implementing control so as to facilitate acceleration of command processing of the disk device when a command is detected by the supervisory means, which command is not executed in spite of a lapse of prescribed time period.

As described above, the command queue control device according to the present invention implements control of facilitating acceleration of the command processing of the disk device when the command which is not executed in spite of lapse of prescribed time period is detected, thus it is capable of facilitating command processing of the disk device even though delay occurs in the command processing of the disk device. Therefore, it becomes possible to secure specific response in the disk device.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

BRIEF DESCRIPTION OF THE DRAWINGS

FIG. 1 is a block diagram showing configuration of one embodiment of the invention;

FIG. 2 is a view showing a constitution of command queue used in the embodiment of FIG. 1.

DETAILED DESCRIPTION OF THE PREFERRED EMBODIMENT

Figure 3:
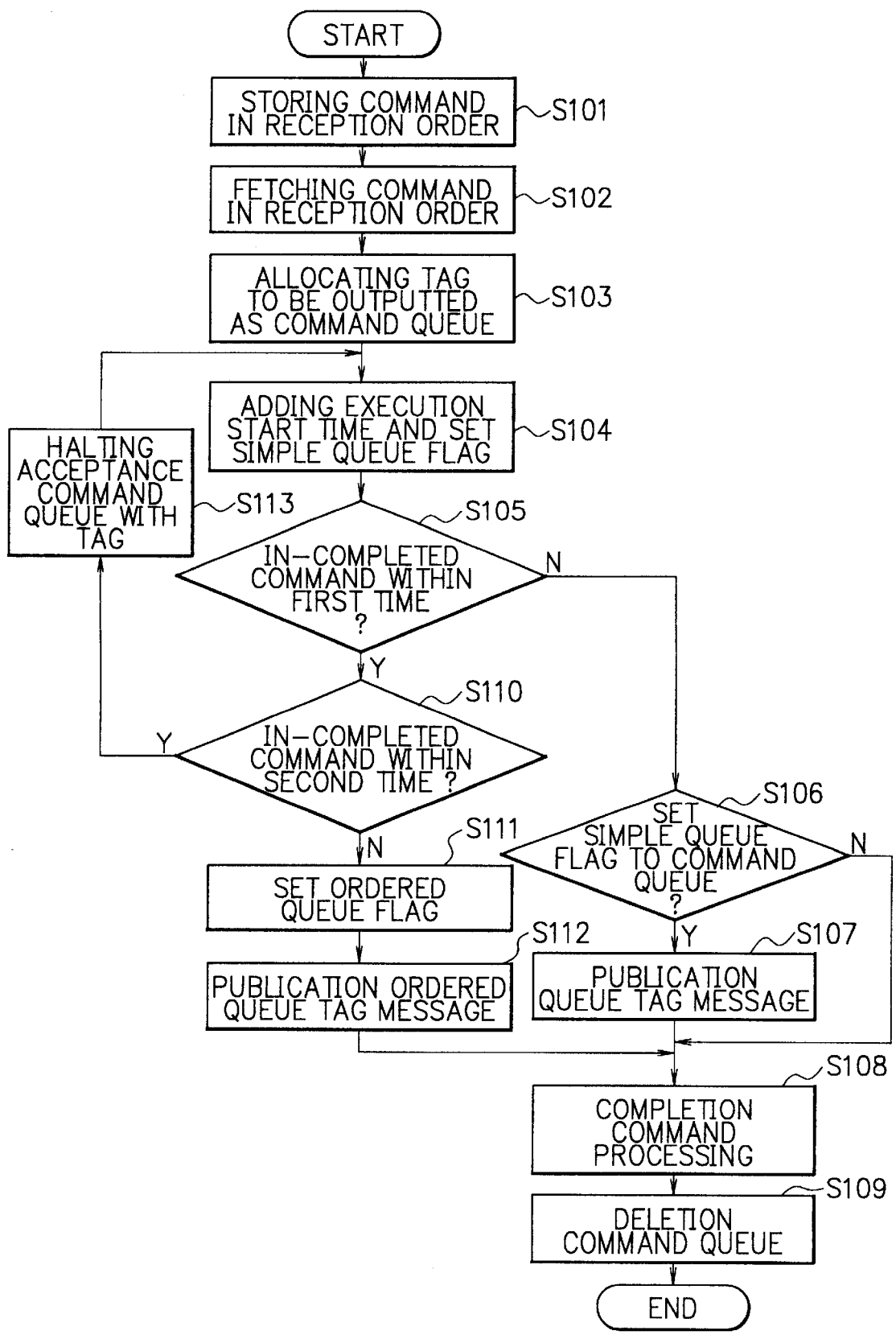
FIG. 3 is a flowchart of operation of the embodiment of FIG. 1.

A preferred embodiment of the present invention will be described in detail in accordance with the accompanying drawings. FIG. 1 is a block diagram showing a configuration of one embodiment of the present invention. In FIG. 1, reference numeral 1 is a host computer which is a superordinate control device. Reference numeral 2 is a disk control device for controlling a disk device 3 based on a command from the host computer 1. The disk device 3 stores information in the disk storage medium according to control of the disk control device 2, or reproduces recorded information.

The disk control device 2 comprises a reception queue storing means 10 for receiving a command published from the host computer 1 to store therein, a tag management means 20 for allocating a tag, which is a queue management number, to respective command queues while fetching the command queue stored in the reception queue storing means 10, a time output means 30 for outputting current time, and a queue management means 40 for adding current time of the time output means 30 to the command queue with the tag outputted from the tag management means 20.

The queue management means 40 stores the command queue to which the time is added in an execution queue storing means 60. Further, the disk control device 2 is provided with a disk command publication part 70 for publishing the command stored in the execution queue storing means 60 to the disk device 3. In addition, the disk control device 2 has a lapse time supervisory means 50 for supervising lapse time of the command on its execution currently in the disk device 3; the lapse command is stored in the execution queue storing means 60. In the present embodiment, as later described in detail, the lapse time supervisory means 50 supervises the lapse time of the command stored in the execution queue storing means 60. The disk control device 2 persuades the disk device 3 into promoting command processing when there is a command which is not completed even though a first establishment time determined beforehand has elapsed. Further, the disk control device 2 halts publishing of the command temporarily to the disk device 3 when there is the command which is not completed even though a second establishment time has elapsed.

FIG. 2 shows a constitution of the command queue stored in the execution queue storing means 60. In FIG. 2, a reference numeral 100 is a time supervisory switching flag. The time supervisory switching flag 100 is set in all of the command queues stored currently in the execution queue storing means 60 when the command, which is not completed even though the first establishment time has elapsed, is detected as later described in detail.

A reference numeral 110 is an execution start time (current time of the time output means 30) added by the queue management means 40. A reference numeral 120 is a Simple Queue flag for instructing publication of the command, with a Simple Queue Tag message, to the disk command publication part 70. A reference numeral 130 is an Ordered Queue flag for instructing publication of the command, with the Ordered Queue Tag message, to the disk command publication part 70. A reference numeral 140 is a tag which is a command management number allocated by the tag management means 20. A reference numeral 150 is a command for publishing to the disk device 3. The Ordered Queue flag 130 is added to the command queue stored in the execution queue storing means 60 when there is a command which is not completed even though the first establishment time is elapsed.

Next, there will be described a concrete operation of the present embodiment in accordance with FIG. 3. FIG. 3 is a flowchart showing an operation of the embodiment of the command queue control device. First, when the command is published from the host computer 1 in sequence, the command 150 from the host computer 1 is stored in the reception queue storing means 10 within the disk control device 2 in reception order (STEP S101). The tag management means 20 fetches the command 150 stored in the reception queue storing means 10 in stored order (STEP S102), before allocating the tag 140 (which is a unique management number of one bite) to a respective command in stored order; the tag 140 is output to the queue management means 40 (STEP S103). When the queue management means 40 accepts the command, the tag management means 20 starts fetching the next command from the reception queue storing means 10 to allocate the tag in sequence.

On the other hand, the time output means 30 always outputs the current time to the queue management means 40 and the lapse time supervisory means 50. Accordingly, when the queue management means 40 accepts the command queue with tag from the tag management means 20, the queue management means 40 adds the current time of the time output means 30 as the execution start time 110. Simultaneously, the queue management means 40 sets the Simple Queue flag 120 to the execution start time 110 to store in the execution queue storing means 60 (STEP S104). The disk command publication part 70 fetches the command queue from the execution queue storing means 60. When the Simple Queue flag 120 is set (STEP S106), the disk command publication part 70 publishes the Simple Queue Tag message, before publishing the command 150 to the disk device 3 (STEP S107).

The disk command publication part 70 publishes the command to the disk device 3, before resetting the Simple Queue flag 120 of the command queue. Further, when the disk command publication part 70 completes the command processing of the disk device 3 (STEP S108), the disk command publication part 70 deletes the command queue which is stored in the execution queue storing means 60 under completion of the processing (STEP S109). Thus, the disk command publication part 70 publishes the command stored in the execution queue storing means 60 to the disk device 3, before deleting the command queue of the execution queue storing means 60 in every successive completion of the command processing.

On the other hand, the lapse time supervisory means 50 determines whether a difference exists between the execution start time 110 of the command queue stored in the execution queue storing means 60 and the current time of the time output means 30, thus supervising whether or not the time of the difference elapses the prescribed time interval. Namely, in the present embodiment, the lapse time supervisory means 50 supervises whether or not the difference in time elapses the first establishment time thereby generating an opportunity when the Ordered Queue Tag message may be published. When the lapse time supervisory means 50 detects the command which is not completed even though the first establishment time elapses, the lapse time supervisory means 50 informs queue management means 40 of this result.

The queue management means 40, which detects the incomplete command (even though the first establishment time has elapsed), sets the Ordered Queue flag 130 to the command queue stored in the execution queue storing means 60 (STEP S105). The queue management means 40 also sets the time supervisory switching flag 100 to the command queue stored in the execution queue storing means 60 (STEP S111). When the Ordered Queue flag 130 is set to the command queue, the disk command publication part 70 publishes the Ordered Queue Tag message (STEP S112), before publishing the command to the disk device 3, thus implementing control so as to facilitate the command processing. Namely, publication of the Ordered Queue Tag message enables the command processing to be facilitated when delay occurs in the command processing of the disk device 3, because the disk device 3 executes preferentially previous command processing.

Furthermore, the lapse time supervisory means 50, when the time supervisory switching flag 100 is set, finds the difference between the current time of the time output means 30 and the execution start time 110 included in the command queue. As a result, the lapse time supervising means 50 supervises whether or not this difference in time elapses the second establishment time (STEP S110), before halting publication of the command temporarily (STEP S113). The lapse time supervisory means 50 detects the command whose processing is not completed, even though the second establishment time has elapsed, before informing the effect thereof to the queue management means 40. The queue management means 40, when the command which is not completed even though the second establishment time elapses is detected, halts reception of the command queue with the tag from the tag management means 20 until completion of the whole command queue of the execution queue storing means 60.

According to this operation, publication of the command halts temporarily from the disk command publication part 70 to the disk device 3. When the queue management means 40 is informed of the fact that the command queue of the execution queue storing means 60 has been fully completed from the lapse time supervisory means 50, the queue management means 40 resumes reception of the command queue with the tag from the tag management means 20 to implement publication of the command to the disk device 3.

In the above-described embodiment, one disk device 3 is connected to the disk control device 2, however, it is preferable that a plurality of disk devices 3 are connected to the disk control device 2. When a plurality of disk devices 3 are connected thereto, it allocates the command queues in every disk device, thus it is preferable to implement the same control in every disk device.

As described above, according to the present invention, when there is the command which is not completed in spite of a lapse of prescribed time period, it is capable of facilitating the command processing of the disk device, even though delay occurs in the command processing of the disk device, by causing the disk device to facilitate acceleration of the command. As a result, it is capable of securing specific response of the disk device. Further, when there is the command whose processing is not completed in spite of lapse of the second prescribed time, it is also capable of securing specific response of the disk device similarly, by halting temporarily publication of the command to the disk device.

While preferred embodiments of the invention have been described using specific term, the description has been for illustrative purpose only, and it is to be understood that changes and variations may be made without departing from the spirit or scope of the following claims.

What is claimed is:

1. A command queue control device comprising:
   a reception queue storing means for storing therein a command received from a host computer;
   a means for allocating a tag of a queue management number to the command stored in said reception queue storing means;
   a means for adding a current time to a command queue to which said tag is allocated;
   an execution queue storing means for storing therein said command queue to which the tag and the current time are added;
   a means for publishing the command to a disk device while fetching the command queue stored in said execution queue storing means;
   a means for supervising a lapse time of the command queue stored in said execution queue storing means; and
   a means for implementing control so as to facilitate acceleration of command processing of said disk device when a command is detected by said lapse time supervisory means, which command is not executed in spite of a lapse of a prescribed time period.

2. A command queue control device as claimed in claim 1, wherein said control means halts publication of a command to said disk device when a command is detected by said lapse time supervisory means, which command is not executed in spite of lapse of a second prescribed time period additionally after elapsing said previous prescribed time period.

3. A command queue control device as claimed claim 2, wherein said control means resumes publication of a command after completion of the whole processing of the command queues stored in said execution queue storing means.

4. A command queue control means as claimed in claim 1, wherein said lapse time supervisory means calculates lapse time period of the command queue from difference between a time added to the command queue and a current time.

5. A command queue control method comprising the steps of:
   a step for storing a command received from a host computer in a reception queue storing means;
   a step for allocating a tag of a queue management number to the command stored in said reception queue storing means;
   a step for adding a current time to a command queue to which said tag is allocated;
   a step for storing said command queue to which the tag and the current time are added in an execution queue storing means;
   a step for publishing the command to a disk device while fetching the command queue stored in said execution queue storing means;
   a step for supervising a lapse time of the command queue stored in said execution queue storing means; and
   a step for implementing control so as to facilitate acceleration of command processing of said disk device when a command is detected by said lapse time supervisory means, which command is not executed in spite of a lapse of a prescribed time period.

6. A command queue control method as claimed in claim 5, wherein said control means halts publication of a command to said disk device when a command is detected by said lapse time supervisory means, which command is not executed in spite of lapse of a second prescribed time period additionally after elapsing said previous prescribed time period.

7. A command queue control method as claimed claim 6, wherein said control means resumes publication of a command after completion of the whole processing of the command queues stored in said execution queue storing means.

8. A command queue control method as claimed in claim 5, wherein said supervisory means calculates lapse time period of the command queue from difference between a time added to the command queue and a current time.

* * * * *